(No Model.)
W. C. MAPLEDORUM.
COVER FOR COOKING UTENSILS.
No. 550,894.                    Patented Dec. 3, 1895.
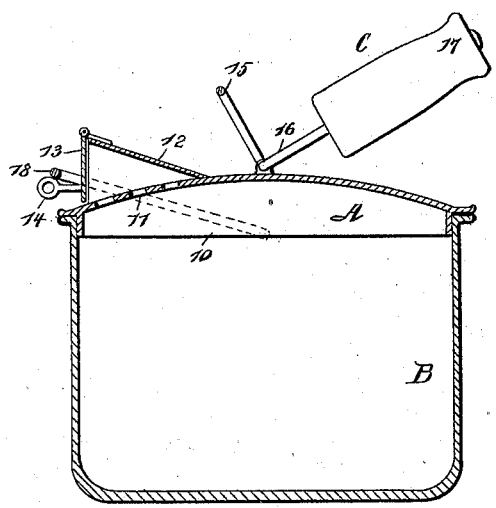
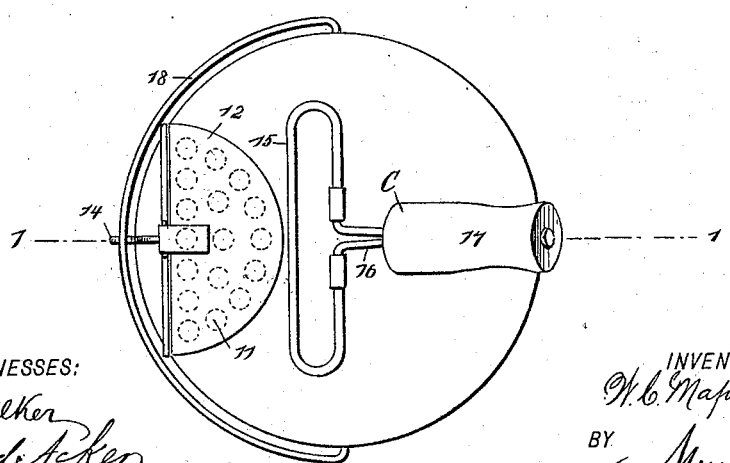
WITNESSES:
INVENTOR
W. C. Mapledorum
BY
Munn & Co
ATTORNEYS.

UNITED STATES PATENT OFFICE.

WILLIAM CURRIE MAPLEDORUM, OF FORT WILLIAM, ASSIGNOR OF ONE-HALF TO SAMUEL W. RAY, OF PORT ARTHUR, CANADA.

COVER FOR COOKING UTENSILS.

SPECIFICATION forming part of Letters Patent No. 550,894, dated December 3, 1895.

Application filed August 30, 1894. Serial No. 521,665. (No model.)

*To all whom it may concern:*

Be it known that I, WILLIAM CURRIE MAPLEDORUM, of Fort William, in the Province of Ontario and Dominion of Canada, have invented a new and Improved Cover for Cooking Utensils, of which the following is a full, clear, and exact description.

The object of my invention is to provide a cover for cooking-vessels so constructed that the danger of burning or scalding the person or hands of the operator when handling a heated pot, pan, or other vessel provided with a cover will be avoided—for example, in pouring out the hot or boiling contents of a vessel; and a further object of the invention is to construct the cover in a simple, durable, and economical manner.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both views.

Figure 1 is a transverse section through a vessel provided with the improved cover, the section being taken, essentially, on the line 1 1 of Fig. 2; and Fig. 2 is a plan view of the cover and vessel containing the same.

In carrying out the invention the cover A is provided with a flange 10, adapted to fit within the vessel B, and at or near the front edge of the cover the body portion thereof is provided with an outlet, preferably made in the nature of a series of openings 11, forming substantially a strainer, the said strainer or outlets being covered by a housing 12 open at the front, and the open end of the housing is normally closed by a hinged lid 13, preferably so constructed that it will remain closed by reason of its own weight and by gravitation, the cover 13 being provided upon its outer face with a guard or stop 14.

The cover is further provided with a handle C, and the said handle comprises a loop-section 15, which is hinged upon the top of the cover at the center thereof, the loop extending forwardly at the rear of the housing 12, and a shank 16, protected by a grip 17, of wood or other non-heat-conducting substance.

When the cover is in position upon the vessel, the bail 18 of the latter is supported by the guard 14, whereby the said bail is prevented from becoming heated, and in the manipulation of the vessel the grip 17 of the handle C is grasped in one hand and the bail is held in the other, and upon tilting the vessel forwardly the liquid contained therein will escape through the outlets or strainer 11, the door 13 thereof being opened by the weight of the material at its back, and when the vessel is so tilted through the medium of the handle C the loop-section thereof is made to bear upon the top of the cover, thus holding the cover firmly in place upon the vessel. Therefore it will be observed that the handle C is practically a lever.

Having thus described my invention, I claim as new and desire to secure by Letters Patent—

1. A cover for culinary vessels, provided with a handle of angular construction pivoted thereon, the lower or horizontal member of the handle engaging the cover when its other member is in an approximately vertical position, as and for the purpose set forth.

2. In a culinary vessel, a cover provided with a handle located upon its upper surface, the said handle comprising an upwardly-extending shank member and a horizontal loop member, the latter being adapted to press upon the cover when the shank is carried to a substantially vertical position, the handle being pivoted or hinged to the cover at the junction of its members, substantially as shown and described.

3. A cover for culinary vessels, provided with an outlet near one edge, a housing over the outlet, and a gravity door normally closing the outlet, the said door being provided with a guard adapted as a support for the bail of the vessel to which the cover is applied, as and for the purpose set forth.

WILLIAM CURRIE MAPLEDORUM.

Witnesses:
C. ELLIOT,
W. C. MACDONALD.